United States Patent
Zhang et al.

(10) Patent No.: US 11,852,610 B2
(45) Date of Patent: Dec. 26, 2023

(54) METHOD FOR DETECTING TENSION FORCE DEFECT OF STEEL CABLE

(71) Applicant: HARBIN INSTITUTE OF TECHNOLOGY, SHENZHEN, Shenzhen (CN)

(72) Inventors: Donglai Zhang, Shenzhen (CN); Wei Gao, Shenzhen (CN); Xueli Zhu, Shenzhen (CN)

(73) Assignee: HARBIN INSTITUTE OF TECHNOLOGY, SHENZHEN, Shenzhen (CN)

( * ) Notice: Subject to any disclaimer, the term of this patent is extended or adjusted under 35 U.S.C. 154(b) by 0 days.

(21) Appl. No.: 18/025,403

(22) PCT Filed: Mar. 19, 2021

(86) PCT No.: PCT/CN2021/081787
§ 371 (c)(1),
(2) Date: Mar. 9, 2023

(87) PCT Pub. No.: WO2022/052440
PCT Pub. Date: Mar. 17, 2022

(65) Prior Publication Data
US 2023/0288377 A1    Sep. 14, 2023

(30) Foreign Application Priority Data
Sep. 10, 2020    (CN) .......................... 202010948050.8

(51) Int. Cl.
*G01N 29/12* (2006.01)
*G01N 29/04* (2006.01)

(52) U.S. Cl.
CPC ........... *G01N 29/12* (2013.01); *G01N 29/048* (2013.01); *G01N 2291/0234* (2013.01)

(58) Field of Classification Search
CPC ................ G01N 29/12; G01N 29/048; G01N 2291/0234
(Continued)

(56) References Cited

U.S. PATENT DOCUMENTS

| 5,821,430 A * | 10/1998 | Kwun ....................... G01L 5/10 73/862.41 |
| 8,536,861 B2 * | 9/2013 | Furusawa .............. G01N 27/83 324/241 |
| 9,103,798 B2 * | 8/2015 | Weischedel ............ G01N 27/83 |

FOREIGN PATENT DOCUMENTS

| CN | 101666783 A | 3/2010 |
| CN | 101963536 * | 2/2011 |

(Continued)

OTHER PUBLICATIONS

Donglai Zhang, et al., Determination of Natural Frequencies of Pipes Using White Noise for Magnetostrictive Longitudinal Guided-Wave Nondestructive Testing, IEEE Transactions on Instrumentation and Measurement, 2020, pp. 2678-2685, vol. 69, No. 6.
(Continued)

*Primary Examiner* — Jacques M Saint Surin
(74) *Attorney, Agent, or Firm* — Bayramoglu Law Offices LLC

(57) ABSTRACT

A method for detecting a tension force defect of a steel cable includes the following steps: step S10: providing an excitation sensor on a first position of a steel cable to be detected and providing a detection sensor on a second position of the steel cable; step S20: obtaining a value of a tension force on the steel cable and obtaining a first display diagram corresponding to the value of the tension force; step S30: loading a white noise signal on the excitation sensor through a power amplifier; step S40: acquiring a detection signal collected by the detection sensor; step S50: uploading the detection signal to a personal computer (PC) and performing a Fast
(Continued)

Fourier Transform (FFT) process on the detection signal; step S60: determining whether there is a defect in the steel cable, and if so, performing step S70; step S70: determining a defect position of the steel cable.

5 Claims, 4 Drawing Sheets

(58) Field of Classification Search
USPC .......................................................... 73/622
See application file for complete search history.

(56) References Cited

FOREIGN PATENT DOCUMENTS

| CN | 103424472 | A | | 12/2013 |
|----|-----------|---|---|---------|
| CN | 203396752 | U | | 1/2014 |
| CN | 104792404 | A | | 7/2015 |
| CN | 104848973 | A | | 8/2015 |
| CN | 106950282 | A | | 7/2017 |
| CN | 107860465 | A | | 3/2018 |
| CN | 107941898 | A | | 4/2018 |
| CN | 108152375 | A | | 6/2018 |
| CN | 109187752 | A | | 1/2019 |
| CN | 112098522 | A | | 12/2020 |
| JP | 2000241397 | A | | 9/2000 |
| KR | 100373517 | | * | 2/2003 |

OTHER PUBLICATIONS

Tang Bo, et al., Design of Automatic Measurement System for Internal Force of Steel Rope, J of China Three Gorges Univ. (Natural Sciences), 2001, pp. 525-529, vol. 23, No. 6.

* cited by examiner

METHOD FOR DETECTING TENSION FORCE DEFECT OF STEEL CABLE

CROSS REFERENCE TO THE RELATED APPLICATIONS

This application is the national phase entry of International Application No. PCT/CN2021/081787, filed on Mar. 19, 2021, which is based upon and claims priority to Chinese Patent Application No. 202010948050.8, filed on Sep. 10, 2020, the entire contents of which are incorporated herein by reference.

TECHNICAL FIELD

The present invention belongs to the technical field of steel cable testing, particularly a method for detecting a tension force defect of a steel cable.

BACKGROUND

At present, a miniature steel cable is a kind of skeleton material and is widely used to manufacture an elevator traction steel belt, a conveyor belt, and a synchronous belt. This kind of steel cable has the advantages of small diameter, high spinning quality, high homogeneity, low rotation number, and strong adhesion with surface materials. However, the current miniature steel cable testing focuses on defect detection and does not pay attention to impacts on the natural frequency of the steel cable caused by the change of the tension force. Additionally, when the tension force on the steel cable changes, the velocity and amplitude of a guided wave as well as the energy coupling among steel wires will change, but there is no effective method to judge the change of these parameters at present.

Therefore, it is imperative to develop a method for detecting a tension force defect of a steel cable.

SUMMARY

Technical Problems

The main objective of the present invention is to provide a method for detecting a tension force defect of a steel cable to solve the technical problems mentioned in the background.

Technical Solutions

A method for detecting a tension force defect of a steel cable according to the present invention includes the following steps: step S10: providing an excitation sensor on a first position of a steel cable to be detected and providing a detection sensor on a second position of the steel cable; step S20: obtaining a value of a tension force on the steel cable and obtaining a first display diagram corresponding to the value of the tension force; step S30: loading a white noise signal on the excitation sensor through a power amplifier; step S40: acquiring a detection signal collected by the detection sensor within a first preset time period; step S50: uploading the detection signal to a personal computer (PC) and performing a Fast Fourier Transform (FFT) process on the detection signal to generate a second display diagram showing a natural frequency spectrum and a direct guided wave amplitude; step S60: determining whether there is a defect in the steel cable according to the first display diagram and the second display diagram and if so, performing step S70; step S70: determining a defect position of the steel cable.

Preferably, step S70 specifically includes: step S71: obtaining a third display diagram corresponding to the value of the tension force; step S72: generating a fourth display diagram related to the direct guided wave amplitude and a propagation time according to the second display diagram; step S73: determining a propagation time of a defect guided wave according to the third display diagram and the fourth display diagram; step S74: calculating the defect position of the steel cable according to the propagation time.

Preferably, the third display diagram is a diagram showing the direct guided wave amplitude and the propagation time when the steel cable has no defect.

Preferably, the first display diagram shows a line segment related to a natural frequency spectrum and a direct guided wave amplitude when the steel cable has no defect.

Preferably, the first position is 0.8 m from an end of the steel cable, and the second position is 2.0 m from the end of the steel cable.

The Advantages of the Present Invention

The method for detecting the tension force defect of the steel cable according to the present invention has the following advantages: The present invention detects a natural frequency of the miniature steel cable by applying a white noise signal to the miniature steel cable using a longitudinal guided wave sensor, detects the tension force on the steel cable by the change of the natural frequency, and monitors whether the tension force changes. At the same time, the excitation frequency of the guided wave is selected according to the detected natural frequency to achieve the maximum guided wave amplitude. The guided wave signal is used to determine whether there is a defect in the steel cable and accurately calculate the defect position.

The objective realization, functional features, and advantages of the present invention will be further explained in combination with the embodiments and with reference to the drawings.

DETAILED DESCRIPTION OF THE EMBODIMENTS

The specific embodiments described herein are used to describe the present invention clearly and are not used to limit the present invention. It is noted that related terms such as "first", "second", and the like can be used to describe various components, but these terms do not limit the component. These terms are used to distinguish one component from another. For example, without departing from the scope of the present invention, the first component may be called the second component, and the second component may similarly be referred to as the first component. The term "and/or" refers to the combination of one or more of the related items and descriptive items.

The miniature steel cable testing mentioned in the background specifically relates to a steel cable. A steel cable is a kind of skeleton material and is widely used to manufacture an elevator traction steel belt, a conveyor belt, and a synchronous belt. This kind of steel cable has the advantages of a tiny diameter, high spinning quality, high homogeneity, low rotation number, and strong adhesion with surface materials. Magnetic flux leakage nondestructive testing is widely used in the nondestructive testing of steel cables. The magnetic flux leakage testing of a pipeline can detect not only the location and size of defects but also the internal defects of the pipeline. Additionally, through signal processing, the online testing of the steel cable can be realized in a complex electromagnetic environment. Compared with a traditional point-to-point testing method, the magnetostrictive guided wave can quickly inspect a long-distance structure without a coupling agent, which makes it widely used in nondestructive testing and structural health monitoring (SHM). When a guided wave is used to inspect the steel cable, the tension force on the steel cable will cause the loss of a longitudinal guided wave band, and this frequency is a notch frequency. When the tension force on the steel cable is different, the best excitation frequency and the wave velocity will change. Furthermore, with the change of tension force, the coupling form of energy of the guided wave between steel wires will change, but the specific change law between the coupling form and the tension force is not put forward in any paper. Since the coupling relationship between the steel wires of the steel cable is nonlinear, when the tension force changes, it will lead to a change in the amplitude of the frequency-multiplying harmonic wave produced by the propagation of the ultrasonic-guided wave in a steel strand. That is, the existing detection methods do not take into account the value of a current tension force on the steel cable, so the detection results are not accurate.

Figure 1:
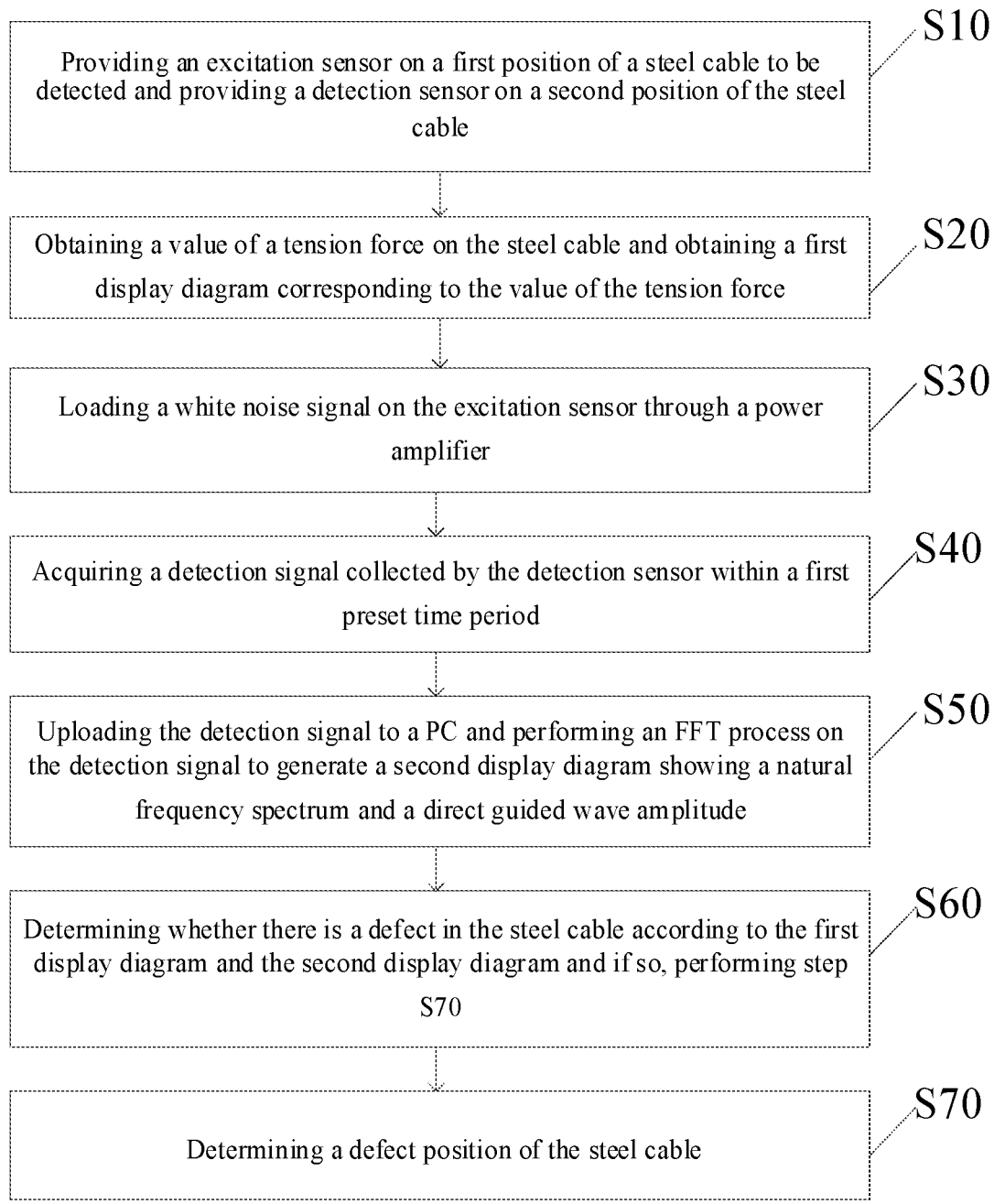
FIG. 1 is a flow chart of a method for detecting a tension force defect of a steel cable according to Embodiment I of the present invention.
Figure 3:
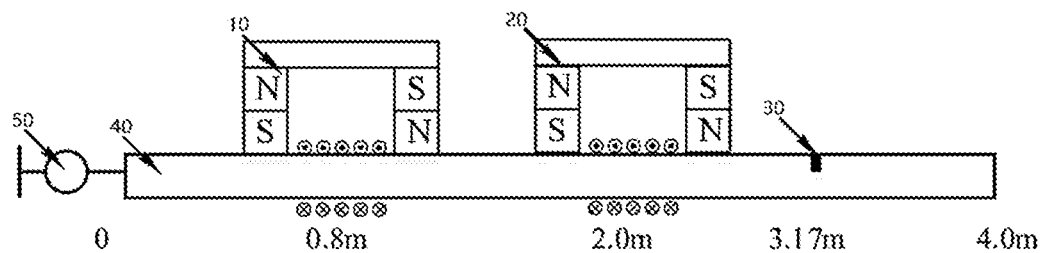
FIG. 3 is a schematic diagram of step S10 of the present invention.

As shown in FIG. 1, to solve the above technical problems, FIG. 1 shows a flow chart of Embodiment I of a method for detecting a tension force defect of a steel cable provided by the present invention. The present invention provides a method for detecting the tension force defect of the steel cable, including the following steps: As shown in FIG. 3, in step S10, the excitation sensor 10 is provided on the first position of the steel cable 40 to be detected, and the detection sensor 20 is provided on the second position of the steel cable 40. In step S10, the steel cable can be tested in the practical application, and the operator does not need to take the steel cable down and place it on the platform for testing. Specifically, the first position is set at 0.8 m from an end of the steel cable, and the second position is set at 2.0 m from the end of the steel cable. Certainly, the specific setting positions can be adjusted according to actual needs.

Figure 5:
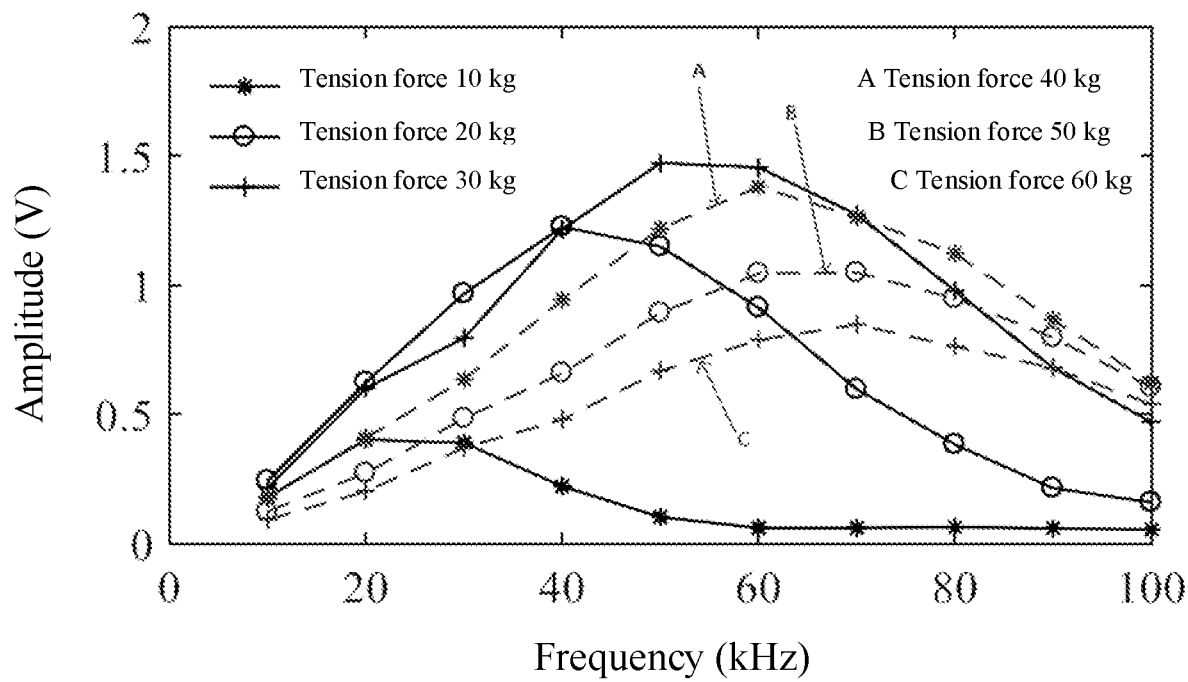
FIG. 5 is a first display diagram referred to in step S20 of the present invention.

Step S20: The value of the tension force on the steel cable is obtained, and the first display diagram corresponding to the value of the tension force is obtained (as shown in FIG. 5). The first display diagram shows a first line segment related to a natural frequency spectrum and the direct guided wave amplitude when the steel cable has no defect. As shown in FIG. 5, there are six line segments, namely, the related line segments of 10 kg tension force, 20 kg tension force, 30 kg tension force, 40 kg tension force, 50 kg tension force, and 60 kg tension force.

Step S30: A white noise signal is loaded on the excitation sensor through a power amplifier so that the excitation sensor sends an electrical signal to the steel cable. In step S30, the value change of the guided wave amplitude can be accurately reflected by the white noise signal. When the frequency spectrum energy of the white noise detection signal is large, the peak value of the direct guided wave is large accordingly. Therefore, the change of the direct guided wave amplitude at different frequencies can be accurately verified by the white noise detection signal. The electrical signal is transmitted on the steel cable.

Figure 6:
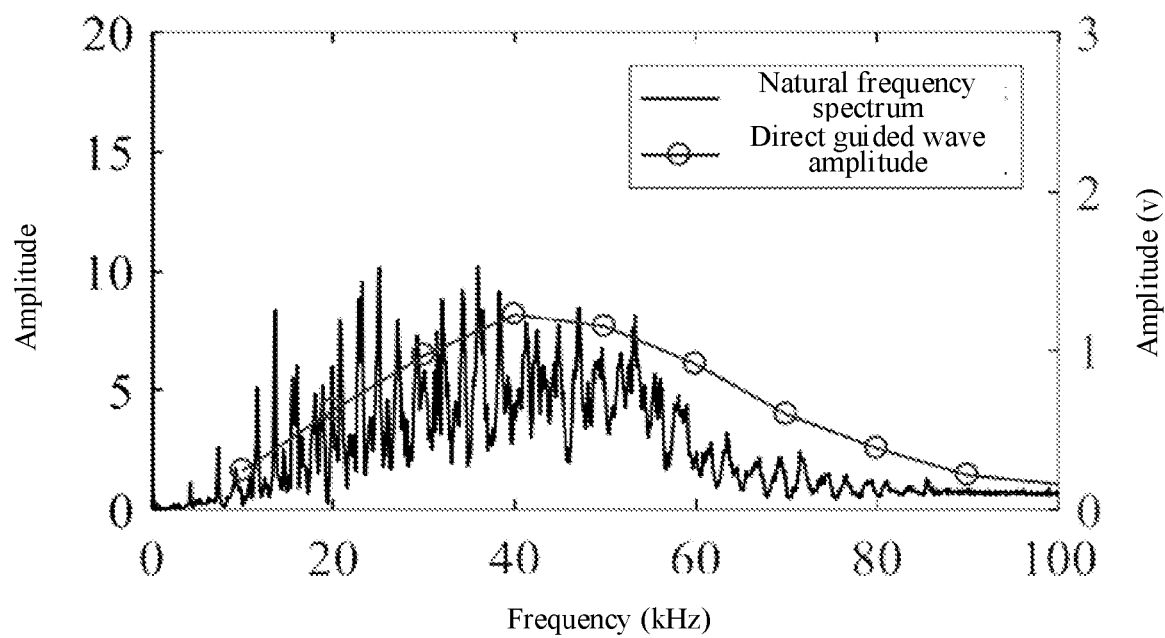
FIG. 6 is a second display diagram referred to in step S50 of the present invention.

Step S40: The detection signal collected by the detection sensor 20 is acquired within a first preset time period. Step S50: The detection signal is uploaded to a PC and processed by an FFT to generate a second display diagram showing a second line segment related to the natural frequency spectrum and the direct guided wave amplitude (as shown in FIG. 6). Step S60: Whether there is a defect in the steel cable is determined according to the first display diagram (as shown in FIG. 5) and the second display diagram (as shown in FIG. 6), and if so, step S70 is performed. The defect includes the fracture or aging of at least one steel wire in the steel cable.

Specifically, step S60 includes: placing the first line segment and the second line segment in the same coordinate system to compare a coincidence degree to determine whether there is an error region, and if there is an error region, step S70 is performed. The error region represents a newly added signal region, which can be understood as the non-coincidence region between the first line segment and the second line segment, that is, the newly added signal region represents a defect guided wave. When there is an error region, it indicates that there is a defect in the steel cable.

Step S70: The defect position of the steel cable is determined.

The method for detecting the tension force defect of the steel cable according to the present invention has the following advantages: The present invention detects the natural frequency of the miniature steel cable by applying the white noise signal to the miniature steel cable using the longitudinal guided wave sensor, detects the tension force on the steel cable by the change of the natural frequency, and monitors whether the tension force changes. At the same time, the excitation frequency of the guided wave is selected according to the detected natural frequency to achieve the maximum guided wave amplitude. The guided wave signal is used to determine whether there is a defect in the steel cable and accurately calculate the defect position.

Figure 2:
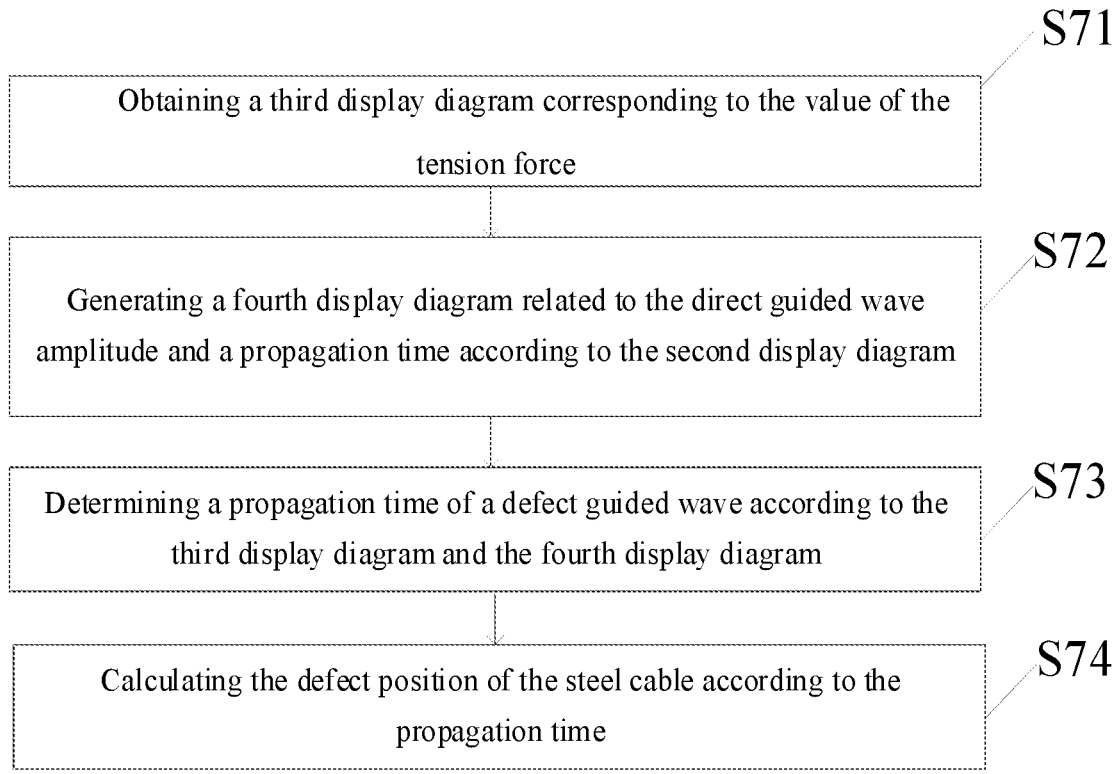
FIG. 2 is a flow chart showing the detailed process of step S70 in the method for detecting the tension force defect of the steel cable according to Embodiment I of the present invention.
Figure 4:
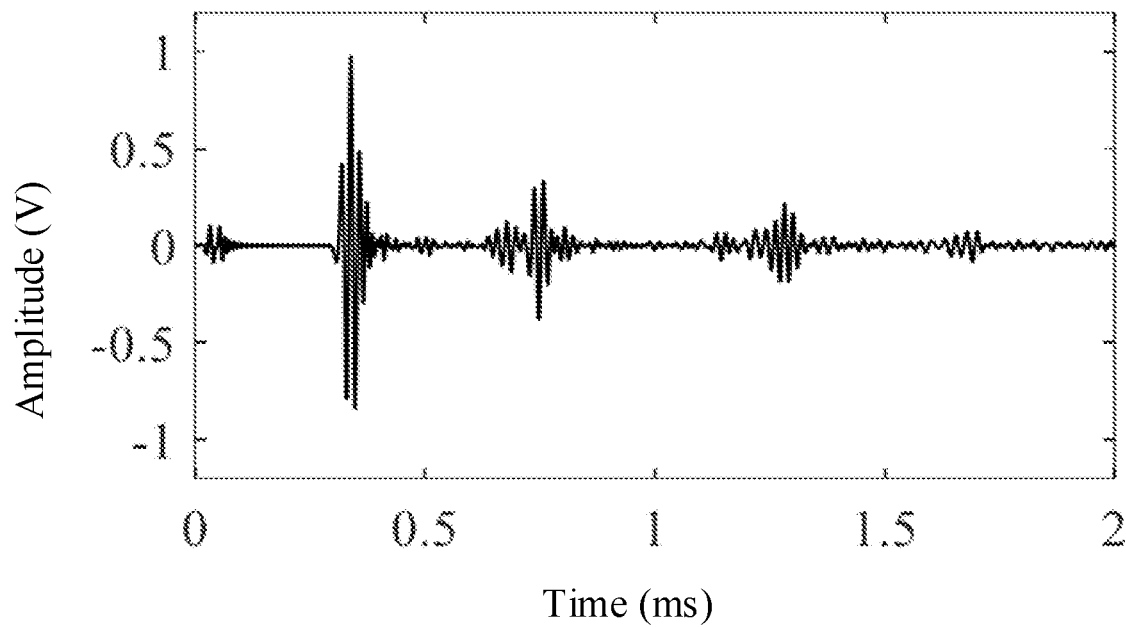
FIG. 4 is a third display diagram referred to in step S71 of the present invention.
Figure 7:
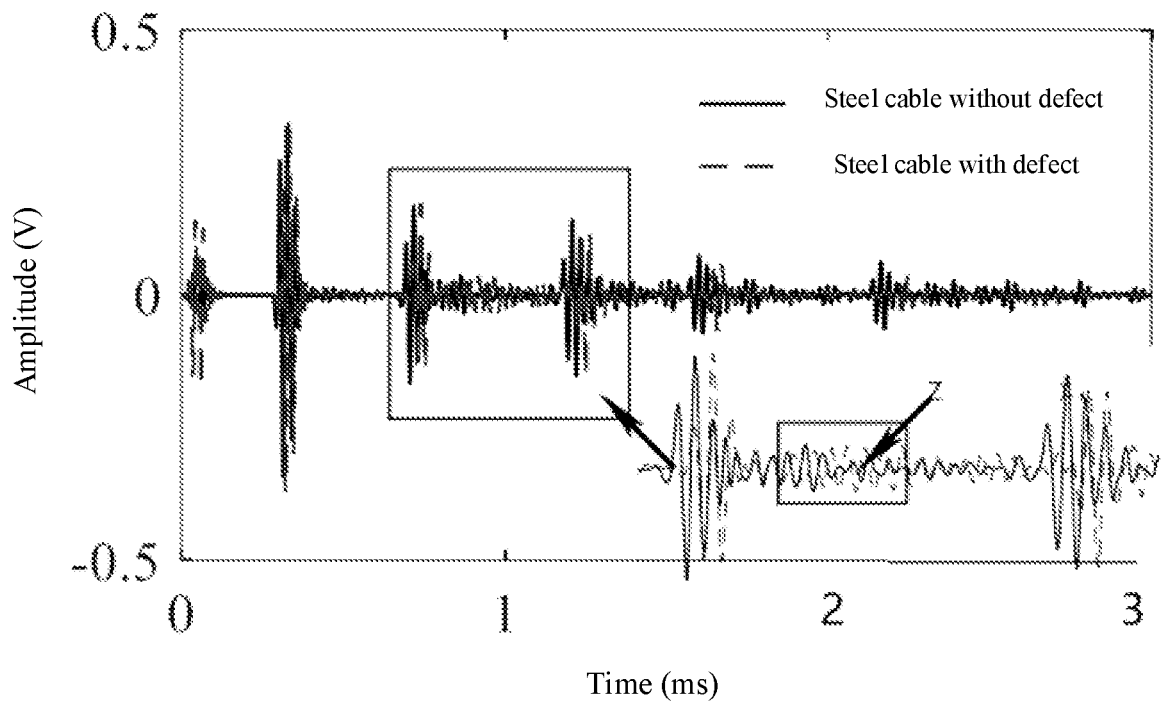
FIG. 7 is a schematic diagram of steps S60 and S70 of the present invention.

As shown in FIG. 2, step S70 preferably includes: Step S71: The third display diagram corresponding to the value of the tension force is obtained (as shown in FIG. 4). Specifically, the third display diagram shows the third line segment related to the direct guided wave amplitude and propagation time when the steel cable has no defect (as shown in FIG. 4 and the solid line as shown in FIG. 7).

Step S72: A fourth display diagram related to the direct guided wave amplitude and the propagation time is generated according to the second display diagram (as shown in FIG. 6). The propagation time represents the propagation time of the electrical signal on the steel cable. The fourth display diagram shows the fourth line segment (the dotted line segment in FIG. 7) related to the direct guided wave amplitude and the propagation time after the electrical signal propagating on the steel cable.

Step S73: The propagation time of the defect guided wave Z is determined according to the third display diagram and the fourth display diagram. Step S74: The defect position of the steel cable is calculated according to the propagation time.

In step S74, 1/2 of the product of the guided wave velocity and the propagation time represents the distance from the defect position to the detection sensor 20.

The advantages of the present invention: 1) The natural frequency of the steel cable can be detected under the condition of low power consumption. 2) The change of the natural frequency of the steel cable can be detected in real-time to determine the change of tension force of the steel cable. 3) The value of the guided wave amplitude can be determined by the value of the energy density of the natural frequency spectrum, the excitation frequency of the maximum guided wave amplitude can be selected, and the signal-to-noise ratio of the guided wave can be improved. 4) It can realize the condition monitoring and defect detection of the steel cable.

Through the above points, the steel wire tension force and defect detection can be effectively achieved.

The above are only preferred embodiments of the present invention and do not limit the scope of the present invention. Any equivalent structure or equivalent process transformation made by using the specification and the drawings of the present invention or the direct or indirect application of the present invention in other related technical fields are similarly included in the scope of protection of the present invention.

What is claimed is:

1. A method for detecting a tension force defect of a steel cable, comprising the following steps:
    step S10: providing an excitation sensor on a first position of the steel cable to be detected and providing a detection sensor on a second position of the steel cable;
    step S20: obtaining a value of a tension force on the steel cable and obtaining a first display diagram corresponding to the value of the tension force;
    step S30: loading a white noise signal on the excitation sensor through a power amplifier;
    step S40: acquiring a detection signal collected by the detection sensor within a first preset time period;
    step S50: uploading the detection signal to a personal computer (PC) and performing a Fast Fourier Transform (FFT) process on the detection signal to generate a second display diagram showing a natural frequency spectrum and a direct guided wave amplitude;
    step S60: determining whether there is a defect in the steel cable according to the first display diagram and the second display diagram, and if so, performing step S70;
    step S70: determining a defect position of the steel cable.

2. The method for detecting the tension force defect of the steel cable according to claim 1, wherein step S70 specifically comprises:
    step S71: obtaining a third display diagram corresponding to the value of the tension force;
    step S72: generating a fourth display diagram related to the direct guided wave amplitude and a propagation time according to the second display diagram;
    step S73: determining a propagation time of a defect guided wave according to the third display diagram and the fourth display diagram;
    step S74: calculating the defect position of the steel cable according to the propagation time.

3. The method for detecting the tension force defect of the steel cable according to claim 2, wherein the third display diagram is a diagram showing the direct guided wave amplitude and the propagation time when the steel cable has no defect.

4. The method for detecting the tension force defect of the steel cable according to claim 1, wherein the first display diagram shows a line segment related to the natural frequency spectrum and the direct guided wave amplitude when the steel cable has no defect.

5. The method for detecting the tension force defect of the steel cable according to claim 1, wherein the first position is 0.8 m from an end of the steel cable, and the second position is 2.0 m from the end of the steel cable.

* * * * *